(12) United States Patent
Dvorak et al.

(10) Patent No.: US 7,689,450 B1
(45) Date of Patent: Mar. 30, 2010

(54) MULTIPURPOSE CAUSAL EVENT CALENDAR FOR INTEGRATED MANAGEMENT DECISION SUPPORT

(75) Inventors: Robert E. Dvorak, Atherton, CA (US); Kevin Katari, Moraga, CA (US)

(73) Assignee: Bluefire Systems, Inc., Boca Raton, FL (US)

( * ) Notice: Subject to any disclaimer, the term of this patent is extended or adjusted under 35 U.S.C. 154(b) by 1254 days.

(21) Appl. No.: 09/760,377

(22) Filed: Jan. 12, 2001

(51) Int. Cl.
*G06F 17/30* (2006.01)
(52) U.S. Cl. ....................................................... 705/10
(58) Field of Classification Search ..................... 705/8, 705/10, 28
See application file for complete search history.

(56) References Cited

U.S. PATENT DOCUMENTS

| | | | |
|---|---|---|---|
| 5,168,445 A | 12/1992 | Kawashima et al. | |
| 5,596,493 A | 1/1997 | Tone et al. | |
| 5,712,985 A * | 1/1998 | Lee et al. | 705/7 |
| 5,832,456 A * | 11/1998 | Fox et al. | 705/10 |
| 5,953,707 A * | 9/1999 | Huang et al. | 705/10 |
| 5,966,695 A | 10/1999 | Melchione et al. | |
| 6,029,139 A * | 2/2000 | Cunningham et al. | 705/10 |
| 6,151,582 A * | 11/2000 | Huang et al. | 705/8 |
| 6,341,269 B1 * | 1/2002 | Dulaney et al. | 705/22 |
| 6,370,509 B1 * | 4/2002 | Ross et al. | 705/1 |
| 6,434,544 B1 | 8/2002 | Bakalash et al. | |
| 6,493,678 B1 | 12/2002 | Foster et al. | |
| 6,510,420 B1 | 1/2003 | Cessna et al. | |
| 6,584,447 B1 * | 6/2003 | Fox et al. | 705/10 |
| 6,609,101 B1 * | 8/2003 | Landvater | 705/10 |
| 6,834,266 B2 | 12/2004 | Kumar et al. | |
| 6,910,017 B1 * | 6/2005 | Woo et al. | 705/10 |
| 7,080,026 B2 * | 7/2006 | Singh et al. | 705/10 |
| 7,222,082 B1 * | 5/2007 | Adhikari et al. | 705/8 |
| 2002/0099678 A1 * | 7/2002 | Albright et al. | 706/45 |
| 2002/0120459 A1 * | 8/2002 | Dick et al. | 705/1 |
| 2002/0128890 A1 * | 9/2002 | Dick et al. | 705/8 |
| 2002/0147630 A1 | 10/2002 | Rose et al. | |

(Continued)

OTHER PUBLICATIONS

Screenshots, www.grossprofit.com, Oct. 18, 2000 [retrieved Sep. 9, 2004], pp. 1-9, retrieved from: archive.org and google.com.*

(Continued)

*Primary Examiner*—Beth V Boswell
(74) *Attorney, Agent, or Firm*—Ernest J. Beffel, Jr.; Haynes Beffel & Wolfeld LLP

(57) ABSTRACT

Aspects of the present invention include improvements to a management decision support system. Before improvement, the system includes a computer system having memory and resources, a retail demand forecasting program applying one or more forecasting approaches, running on the computer system and utilizing the output, said analysis programs generating at least one of (a) order of goods from a supplier-related data, (b) allocation of the goods to be shipped by the supplier-related data, or (c) distribution of goods to selling locations-related data. The improvements, according to one aspect of the invention, include a causal calendar utilized by the forecasting program to generate the output, the calendar including certain attributes for a plurality of events, and an analysis program to generate open to buy reports. Other aspects of the present invention are described in the specification, drawing and claims.

6 Claims, 1 Drawing Sheet

U.S. PATENT DOCUMENTS

| | | | |
|---|---|---|---|
| 2003/0061081 A1* | 3/2003 | Kellond et al. ................. | 705/7 |
| 2003/0074251 A1 | 4/2003 | Kumar et al. | |
| 2003/0195791 A1* | 10/2003 | Waller et al. ................. | 705/10 |
| 2003/0229502 A1 | 12/2003 | Woo | |

OTHER PUBLICATIONS

Koloszyc, Ginger, "Merchants Try Complex Math Tools to Improve Inventory Decisions", Stores Magazine, Nov. 1998 [retrieved Sep. 9, 2004], pp. 1-3, retrieved from: Archive.org and Google.com.*

Ackerman, Jerry, "Looking Back to Fashion's Future", The Boston Globe, Oct. 7, 1998 [retrieved Sep. 9, 2004], pp. 1-3, retrieved from: Google.com and archive.org.*

Silva-Rosso, Jorge M. et al., "A Decision Support System for Planning Manufacturer's Sales Promotion Calendar", Marketing Science, 1999, pp. 275-300.*

Baty, James et al., "Intershop: A Distributed Architecture for Electronic Shopping", International Conference on Information Systems, 1995, 13 pages, retrieved from: Google Scholar.*

Johnson, Matt, "Collaboration Data Modeling: CPFR Implementation Guidelines", Council of Logistics Management, 1999, 11 pages, retrieved from: Google Scholar.*

Hauge et al., "*How Low Can You Go? Using Simulation to Determine Appropriate Inventory Levels*", attributed to IIE Lean Management Solutions, Sep. 23-24, 2002, Seattle, WA, (publication data unverified) <http://www.novasim.com/downloads/How%20Low%20Can%20You%20Go.pdf>, accessed Jan. 10, 2005.

Kumar, Mahesh et al., Clustering Seasonality Patterns in the Presence of Errors, Paper 155, May 2002, http://ebusiness.mit.edu.

Kumar, Mahesh, Error-based Clustering and Its Application to Sales Forecasting in Retail Merchandising, Sep. 2003, Massachusetts Institute of Technology.

Lin et al., "*Extended-Enterprise Supply-Chain Management at IBM Personal Systems Group and Other Divisions*", Interfaces 30:1, pp. 7-25, at pp. 12-13 (Jan.-Feb. 2000) available at <http://www.interfaces.smeal.psu.edu/pdf/v30n1a2.pdf>.

Montgomery, Alan, The Implementation Challenge of Pricing Decision Support Systems for Retail Managers, Oct. 2003, Pittsburgh, PA.

Sen, Alper, The U.S. Apparel Industry, Apparel Review, Oct. 2004, Dept. of Industrial Engineering, Bilkent Univ., Bilkent, Ankara, Turkey.

* cited by examiner

MULTIPURPOSE CAUSAL EVENT CALENDAR FOR INTEGRATED MANAGEMENT DECISION SUPPORT

BACKGROUND OF THE INVENTION

Retail management is often responsible for sale of goods from a plurality of selling locations. Refined management decision support is useful in making a variety of decisions involving goods. Reports that support management decisions may cover ordering, allocation of ordered goods being delivered by a supplier, distribution of goods to selling locations, open to buy management, markdown management, bottom-up and top-down planning. These reports, whether delivered on-line, by e-mail or in hard copy, present forecasted results.

Influences on forecasting include regarding events which have impacted past sales and events proposed for the future. However, management support systems generally do not have a causal calendar which allows a computer system to automatically factor in the effects of past and future events, when generating management decision support reports. Moreover, systems integration over the full range of management decision support reports has a long way to go.

Thus, it is desirable to improved management decision support systems, utilizing a causal calendar to as a basis for a variety of management decision support reports.

SUMMARY OF THE INVENTION

Aspects of the present invention include improvements to a management decision support system. Before improvement, the system includes a computer system having memory and resources, a retail demand forecasting program applying one or more forecasting approaches, running on the computer system and utilizing the output, said analysis programs generating at least one of (a) order of goods from a supplier-related data, (b) allocation of the goods to be shipped by the supplier-related data, or (c) distribution of goods to selling locations-related data. The improvements, according to one aspect of the invention, include a causal calendar utilized by the forecasting program to generate the output, the calendar including certain attributes for a plurality of events, and an additional analysis program to generate open to buy reports. Other aspects of the present invention are described in the specification, drawing and claims.

DETAILED DESCRIPTION

Figure 1:
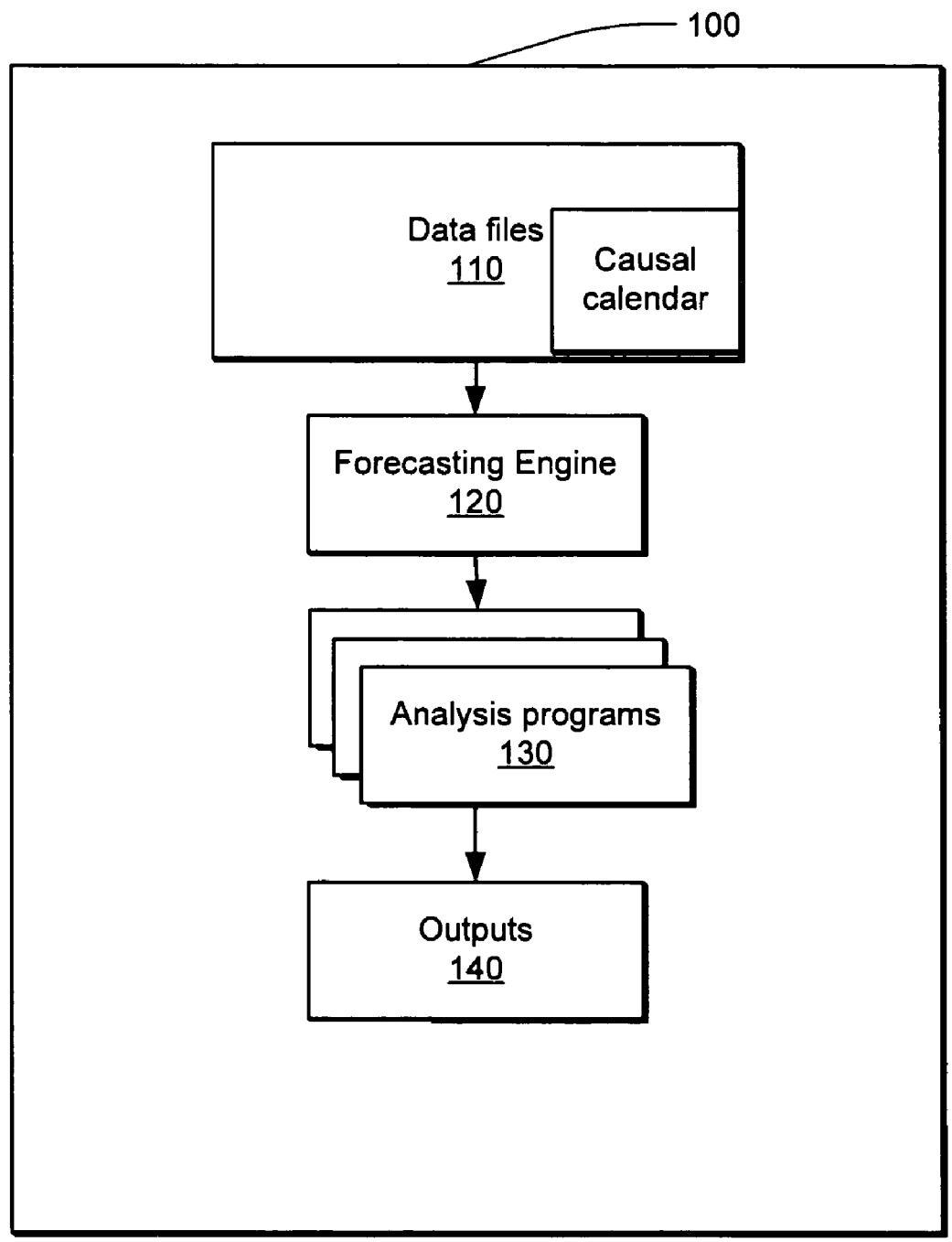
FIG. 1 depicts a system practicing aspects of the present invention.

The following detailed description is made with reference to FIG. 1. Preferred embodiments are described to illustrate the present invention, not to limit its scope, which is defined by the claims. Those of ordinary skill in the art will recognize a variety of equivalent variations on the description that follows.

FIG. 1 is a block diagram of a system practicing aspects of the present invention. A computer system 100 may include one or more computers or servers, having memory and resources for storing data and running analysis programs. The computers or servers may be integrated in a cluster, connected by a SAN or LAN, or coupled at a distance by a WAN. The system may function on an ASP basis, provided by a vendor. The system 100 hosts data files 110, a forecasting engine 120, analysis programs or modules 140, and output devices. Among the data file 110 is a causal calendar file, as described below. The forecasting engine 120 can apply one or more forecasting approaches. For instance, it can operate on daily or more frequent data or on weekly or monthly data. Individual goods or groups of goods can be forecast, either for individual selling locations or groups of selling locations. Different approaches to forecasting include trending sales during this selling period (such as a year); trending sales for this selling period versus the a prior selling period (such as the same period last year); moving average forecasts, with or without exponential smoothing to reduce the effect the effect of outliers; time series forecasts; probabilistic sales forecasts; auto regressive integrated moving average forecasts; etc. The type of forecast made is not the subject of this invention, rather improving management decision support by having a multipurpose causal calendar available and generating a plurality of management decision support reports utilizing the same causal calendar.

The forecasting engine 120 generate output which is used as input to a plurality of analysis programs 130. Analyses which may have been performed by an integrated system in the past include ordering of goods from a supplier, allocation of the good among destination when they are ready to be shipped by the supplier, and distribution of the good to selling locations. In accordance with the present invention, the causal calendar provides information for forecasting which, in turn is used by some or all of the previously available analyses and also by analyses which did not, before this invention, utilize a causal calendar. The additional analyses include open to buy reports, markdown management reports, bottom-up planning reports and top-down planning reports. Greater degree of integration may be preferable to lesser degrees. For instance, two, three or all four of open to buy, markdown management, follow up and top down reports prepared utilizing the same causal calendar that is used for ordering, allocation or buying may be more useful than any one of the reports. Analysis programs produce outputs 140 which are human or machine readable. These outputs may include a display on a monitor in communication with the computer system, a spreadsheet of HTML, XML or other file which can be called up and reviewed by a user, or a printed report on paper, microfiche or optical media (e.g., CD-ROM, CD-R, CD-RW, DVD, etc.) The outputs may be automatically routed by e-mail. Machine readable outputs, for instance, for ordering, may be machine readable inputs to other program modules or systems which take action with or without user review or intervention, such as placing an order with a supplier.

A causal event calendar is a database table or set of tables in which past, present and future causal events are stored. Causal events may include retailer decisions that will affect the rate of sale of one or more goods in one or more selling locations for some period of time, and exogenous factors that will affect the rate of sales of one or more goods for some period of time. Each of these types of events is described in further detail below. Once stored in a database table or set of tables, this information is available for the full range of other retailer information systems or full range of retailer decisions within a system that require the causal events for helping to determine the rate of selling for one or more goods in one or more selling locations for some period of time as an input to their calculations.

Retailer decisions that will affect the rate of sale of one or more goods in one or more selling locations for some period of time include, but are not limited to, price promotions, visual or placement based promotions, promotions of substitute or complementary products, removal of substitute or complementary products from selling assortment, new product or new selling location launch and advertising supported promotions.

Price promotions: A price promotion (for example, a 25% reduction in price for one or more goods for some period of time) will typically increase the rate of selling for those goods whose prices have been reduced.

Visual/placement based promotions: Frequently, a change in visual or placement presentation will increase and decrease the rate of selling of a product. For example, moving the product's in-store location to a high traffic area of the store for a period of time typically will increase sales for that time period relative to the normal rate of selling associated with the product's usual position in the store. Similarly, if the presentation of an good is changed, perhaps displaying it on more than one store fixture, the rate of selling will typically increase. In each of these cases the opposite effect is typically true as well; placement of an good in a less attractive location will usually decrease the rate of selling, as may reducing the number of fixtures where the good is displayed.

Promotions of substitute or complementary products: If a price or visual/placement based promotion is in effect for good A, the sales of good B may be affected if the two goods are substitutes or complementary products. In the case of substitute goods, the promotion of good A will increase the sales rate of good A but decrease the sales rate of good B. For example, if an 8 oz size of a product is promoted, then sales of the other sizes of the same product will likely be reduced, as the goods are substitutes for one another. Products need not have identical ingredients or components to be substitutes; a promotion of a product from one vendor may reduce the rate of selling of similar products from a different vendor. In the case of complementary products, the promotion of good A will increase the sales rate not only of good A, but also of an associated good B as well. For example, if a number of battery-powered toys are placed on promotion, then the rate of sales of batteries may increase during the promotion, even though the batteries themselves are not a promoted good.

Removal of substitute or complementary products from assortment: In manner similar to that described above, if substitute or complementary products are temporarily removed from the assortment, then the rate of selling of another product may be affected. Frequently, to make space for a seasonal or holiday program, some goods are removed from the overall assortment, and the removal of good A may increase or decrease the sales of good B if A and B are complements or substitutes.

New product or selling location launch: Retailers frequently see an acceleration in selling for goods when they are newly introduced, even without special advertising, or see higher sales for otherwise not promoted goods during the start of a new selling location.

Advertising supported promotions: Retailers frequently advertise in newspapers, magazines, on television, and in other media in an effort to increase the rate of selling of some or all products. An increase in advertising spending that is not targeted as specific products may result in an increase in selling rates across many or all goods for some period of time. An increase in advertising spending targeted against specific goods may result in an increase in selling rates for those goods and a few associated goods for some period of time.

Exogenous factors that will affect the rate of sales of one or more goods for some period of time include, but are not limited to, holiday or other calendar based events and traffic increasing events. For some goods, the rate of selling increases significantly during certain times of the year. For example, goods that can be given as gifts usually have a sharply higher rate of selling in the time period just in advance of Christmas. Similarly, goods that can be given as gifts for Mother's Day, Father's Day, or Valentine's Day typically will have a higher rate of selling in advance of these days. Traffic-increasing events also can increase the rate of selling for period of time. For example, the presence of the Olympics in a city can increase the rate of selling for many goods if the selling occurs in a venue that will see increased customer traffic as a result of the event. Other events may have similar effects, such as a summer beach season, or a winter skiing season in a selling location.

The causal event calendar table stores all of the good-event type-date information required to associate good-time periods with events. Typically, the causal calendar would be configured with data fields or attributes that describe the event.

Good Identifier This field is populated with a unique identifier for the good in the event, typically a SKU number.

Selling Location Identifier: This field is populated with a unique identifier for the selling location of the event, typically a store number.

Event Start Date: This field is populated with the start date of the event. For example, if the event were a price promotion, this field would be populated with the date corresponding to the first day of the price promotion.

Event End Date: This field is populated with the end date of the event. For example, if the event were a visual-based promotion, this field would be populated with the last day for which the special visual presentation would be in effect.

Event Description: This field is optionally populated with a description for the event. A description is simply identifies the event name. For example, event description might be populated with "Christmas 2000" or "Spring 2001 White Sale." Alternatively, the event description may be associated, from a separate table, with the Event Type.

Event Type: This field identifies the event type, typically so that the rate of selling in this event can be identified with some prior period in which the same event type was in effect. Event types might include "Pre-Christmas", "Pre-Mother's Day", "50% Markdown", "New Product Introduction" or "25% Price Promotion.

By itself, the causal calendar table or tables is a repository for information. Users enter and maintain data in these tables via a user interface. There are a number of ways to store the data but the objective is to be able to identify for usage by other systems or other parts of the same system which causal events are set for which goods and selling locations. For example, the causal event calendar table or tables could have a row for every unique good/start date/end date/event type. Then if a single good has the same causal event for the same period of time in 100 stores, then the causal event calendar table will be populated with 100 rows with one row for each selling location. If the same event applies to 20 goods in 100 stores, then the causal event calendar table will be populated with 2000 rows. However, there are other ways to store the data that could be used, for example if the 100 stores were all the stores or an identified group of stores, then there might be a single data row entry indicating that the causal event is on for the start date/end date/event description/event type for the group of stores. Or, a group Good Identifier or group Selling Location Identifier can be assigned to a group of goods or selling locations which are treated or considered together. A multi-level grouping of goods or stores may be useful in some settings.

While the causal event calendar stores this information at a granular level, the user interface can be constructed to simplify ease of entry and maintenance. If hierarchies are developed for both the selling locations (typically stores) and for goods, then user entry can occur at these levels. For example, the user could select "all stores" in the selling location hierarchy along with a single good for the good hierarchy and enter the event information, and the causal event calendar system would apply the event information to all selling locations falling below "all stores" in the selling location hierarchy (in this case, presumably all stores). Similarly, if only one region was running the causal event then the user might select the selling locations in "North West Region" and the causal event calendar system would apply the event information to all selling locations falling below "North West Region" in the selling location hierarchy. Similarly, on the good dimension, if an entire department will be in a promotional event, the user could select "Watch department" in the good hierarchy and specify all of the required selling location and event information; in this case, the event information will be applied to all of the goods that fall under "Watch department" in the product hierarchy. Of course, the user may select nodes on both the good and selling location hierarchy, in which case the event will be applied to all goods and all selling locations falling under the specified nodes in the hierarchy. This could be a single good in a single selling location (e.g., like the Gucci Bezel Model 09210 at Store 924) or groups of goods in groups of stores.

The causal event calendar table serves as the single repository of causal event information feeding a range of retail systems or a range of different activities within a system, where the following outlined below could be separate systems or separate activities within a system.

Ordering: An ordering system or ordering activity within a system typically determines the quantity of a product that should be ordered from a distributor or manufacturer in order to meet expected sales with some additional allowance for safety stock. In calculating required order quantities, it is useful to understand the expected rate of future selling for goods that are being ordered. Because the events entered into the causal event calendar will affect the future rate of selling, it is helpful for the ordering system or activity to get this information from the causal event calendar in order to make the most accurate determination of the order quantity. For example, if a future price promotion with a 25% discount were planned and entered into the causal event calendar, then the order quantity would increase relative to the quantity required if the event were not planned for the future.

Allocating: An allocating system or allocating activity within a system typically determines the quantity of goods to be sent from a selling location that either does not stock goods or does not want to stock this good now to the selling locations that stock or use the good. In determining these quantities it is useful to understand the expected rate of future selling for goods that are being allocated. Because the events entered into the causal event calendar will affect the future rate of selling, it is helpful for the allocation system or activity to get this information from the causal event calendar in order to make the most accurate determination of the allocation quantity. For example, if a future price promotion with a 25% discount were planned and entered into the causal event calendar for some of the stores to which the allocation was going, then the allocation quantities to those stores would increase relative to the quantity required if the event were not planned for the future for those stores.

Distributing: A distribution system or distribution activity typically determines the quantity of an good that should move from one stocking location to another stocking location, typically from a distribution center to a store. In calculating required distribution quantities, it is useful to understand the expected rate of selling in the location to which the good is being sent in order to determine the quantity that should be sent. Because the events that are entered into the causal event calendar identify changes in expected future selling rates, it is helpful for the distribution system to get the causal event information from the causal event calendar in order to make the most accurate determination of the distribution quantity.

Bottom-up planning: Bottom-up planning provides good level plans for the future, typically providing sales, inventory, and receipt information on a daily or weekly basis from the present until some point in the future. Because the future rate of selling for each good is a key requirement for correctly calculating future good plans, the bottom-up planning system or bottom-up planning activity should find it is helpful to get the causal event information from the causal event calendar in order to make the most accurate determination of the future rate of selling for the good.

Top-down planning: Top down planning provides plans at levels higher than individual goods, but some differentiate historical discounting where the point of sale (POS) data does not fully capture the causal factors, particularly for the exogenous factors (e.g., selling during Pre-Mothers day is usually not differentiated other than by date in a POS where as type of promotion can be). In these instances it is helpful to have the causal calendar data available to the Top-down Planning system or system activities.

Open-to-buy (OTB) management: In OTB management, future inventory levels are predicted based on current inventory, expected selling, and expected receipts; the future inventory levels are then compared to budgeted levels in order to determine whether the current sales and ordering plan will result in exceeding the inventory budget (typically at the department level or higher). Because the future rate of selling is critical to calculating what future inventory levels will be, the OTB system or OTB activity should find it is helpful to get the causal event information from the causal event calendar in order to make the most accurate determination of the future rate of selling for an good.

Markdown management: A markdown management system or markdown activity within a system typically determines the optimal timing and level of markdowns of a seasonal or fashion program in order to sell the total purchased quantity by a predetermined "out date" while maximizing revenue. In order for a markdown management system to perform, it needs to query the causal event calendar in order to determine what event occur between the date of the markdown analysis and the "out date" in order to calculate the expected selling. For example, an good that has no event planned before its "out date" might require a markdown in order to reach full sell-through based on the rate of selling to-date; however, that same good with the same selling to-date may not require a markdown if some other event—a visual promotion, perhaps—is planned to take effect between the date of analysis and the "out date." Because the future likely rate of selling is critical to calculating what markdowns and markdown levels will be required, the Markdown system or Markdown activity should find it is helpful to get the causal event information from the causal event calendar in order to make the most accurate determination of what markdowns are best.

The systems or system activities discussed above may be further divided by types of goods, for example basic, fashion and seasonal goods. Therefore, you may have one distribution system or system activity for basic goods and another distribution system or system activity for fashion or seasonal goods. The example dimensions upon which the types of goods can be divided are described below:

Basic goods. Goods that are reorderable are frequently called basic and can use different mathematical calculations to determine how much to order, allocate or distribute than other types of goods.

Fashion/Seasonal goods. These goods are usually differentiated from basic goods in that they have limited or no ability to really be reordered once sales performance has been measured. The mathematical calculations to determine how much to order, allocate or distribute can differ by using historical sales profiles rather than specific good history.

Fashion goods. These goods can be further differentiated to goods that have no exact good history and therefore the mathematical calculations are based on historical profiles, in-season selling performance or a combination of the two.

Seasonal goods. These goods can also be further differentiated from fashion goods as having same good or very comparable good sales histories that however are discontinuous because the good is not sold year round. Therefore, the math may use that past good history and some combination of historical profiles and in-season selling performance.

In addition, there may be other differentiations of goods such as goods that are rapidly obsolete (e.g., computers with certain chip configurations) versus those with a longer sales life (e.g., printer supplies for multiple printers).

A multipurpose causal calendar may allow users to enter the causal events in one place, use one approach, and have all the information assessable to all the systems or system activities from one table or set of tables. This increases the likelihood that goods will be handled the same way across multiple systems and that if a good moves from being basic to fashion that the user does not need to reenter information. It means that when an good is considered for markdown, if it has already been ordered, allocated and distributed and the causal information has been entered it is then available for the markdown activity. It also ensures that if a change is made in the past, present or future causal calendar it is effectively made for all the activities. If a single causal event calendar were not maintained, then each system would need to maintain its own causal event calendar or each system would not have the benefit of using future causal information in order to make the best calculations possible. By establishing and maintaining a single causal event calendar that feeds all retail systems or retail activities that require the information, data entry burdens are reduced and consistency is increased.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A computer-implemented method of facilitating data entry and planning for a multitude of goods at a plurality of stores, the method including:
creating a causal calendar in machine readable memory that stores event data for the multitude of goods at the plurality of stores in event data tuples, each of said event data tuples comprising including a good identifier, a store identifier, a start date, a stop date and an event type identifier;
creating
at least one store hierarchy, said store hierarchy organizing the plurality of stores and containing selectable nodes, and
at least one goods hierarchy, said goods hierarchy organizing the multitude of goods and containing selectable nodes,
wherein the store hierarchy and the goods hierarchy simplify entry of the event data into the causal calendar;
presenting a user interface to a planning user, the user interface allowing
user selection of a goods node from the at least one goods hierarchy that represents an individual good and a goods node that represents a grouping of goods,
user selection of a stores node from the at least one store hierarchy that represents an individual store and a stores node that represents a grouping of stores, and
user selection of an event type using the event type identifier;
receiving, from the planning user via the user interface, user selections of nodes with respect to the goods and store hierarchies, and of the event type identifier;
using the received user selections to create at least one event tuple in the causal calendar, wherein selection of the goods node and the stores node causes populating of the at least one event tuple to occur for all goods grouped with the goods node in the goods hierarchy and all stores grouped with the stores node in the store hierarchy;
periodically forecasting demand, using a processor, by accessing the event data tuple in the causal calendar and by applying demand modifiers associated with the selected event type identifier; and
generating analytical reports using the forecasted demand including at least one of ordering, distributing, and bottom-up planning reports.

2. The method of claim 1, wherein the selected goods node and the selected stores node associate the event type identifier with a single good at a group of stores.

3. The method of claim 1, wherein the selected goods node and the selected stores node associate the event type identifier with a group of goods at a single store.

4. The method of claim 1, wherein the selected goods node and the selected stores node associate the event type identifier with a group of goods at a group of stores.

5. The method of claim 1, further including as event types in the causal calendar events involving decisions by a retailer and exogenous events, wherein
the decisions by the retailer include price promotions, advertising promotions, promotions of substitute or complementary products, removal of substitute or complementary products from a selling assortment, and new product introduction; and
the exogenous events include approaching holiday events, seasonal events, and special events in a city that increase customer traffic at a store.

6. The method of claim 1, wherein the generating analytical reports uses the forecasted demand consistently to generate reports that support:
ordering items from suppliers,
allocating item inventory for seasonal or fashion items received from suppliers among stores,
distributing items from a distribution center to stores,
bottom-up planning of sales, on-hand inventory and receipt of items into inventory,
open to buy management reports that compare future inventory levels aggregated to a department level or higher with budgeted levels of inventory investment, and
markdown management that recommends timing and level of markdowns of seasonal or fashion items in order to sell out available inventory by a predetermined out date.

* * * * *